United States Patent Office 3,313,067
Patented Apr. 11, 1967

---

3,313,067
PROCESS FOR DEFLASHING ARTICLES
Donald T. Smith, Newtown, Conn., and Francisco A. Cuetara, La Riviera, Puerto Rico, assignors to General Electric Company, a corporation of New York
No Drawing. Filed Oct. 29, 1964, Ser. No. 405,235
4 Claims. (Cl. 51—320)

This invention relates to a process of finishing the surfaces of solid formed parts or articles and, more particularly, is concerned with the use of polycarbonate resin particles in such a finishing process.

Most solid parts formed of metal, rubber, or of a natural or synthetic resinous material are subjected to finishing operations in order to remove any "flash" which formed on the surfaces of the parts during the forming process. "Flash" as used herein refers to the parting line residue resulting from any molding or casting operation, as, for example, the excess metal or resin material attached to the formed parts which was squeezed out of the mold cavity, as, for example, when a compression mold closes or as the pressure is applied to a transfer or injection mold. A method for removing flash involves contacting the solid formed parts which are to be finished with a medium which tends to abrade away the flash from the surfaces of the part. For example, this may be accomplished through a process referred to as "tumble finishing" in which the formed parts are loaded into a rotatable barrel or container together with the deflashing medium. The barrel is then sealed and is rotated at a speed sufficiently high to propel the deflashing media against the formed parts with sufficient force to remove the flash.

A second more recent approach in removing flash from formed parts involves a process referred to as "airless blast deflashing." This process consists of bombarding the formed parts with small non-abrading pellets which break off the flash material by impact. The equipment employed to effect airless blast deflashing includes four basic components: a wheel rotating at high velocity, used to hurl the abrasive pellets at the molded parts; a conveyor belt or turntable for moving and/or tumbling the formed parts through the work area; a pellet recycling system; and a dust collector.

Heretofore, the best results in tumble finishing and airless blast deflashing of formed parts, such as, for example, molded synthetic resin parts, have been obtained through the use of crushed nut shells or fruit pits as deflashing media. Such media have been found to possess enough mass to be propelled at the molded part with sufficient energy to break off the flash but are not so sharp or massive as to seriously affect the integrity of the formed parts. The use of nylon particles in such operations has also been suggested.

However, use of the foregoing media in deflashing operations is troublesome in many ways. For example, crushed nut shells and fruit pits break up during the deflashing operation generating smaller particles which adhere to the molded parts which are treated. Moisture must be added to the deflashing media in order to minimize its degradation during the deflashing operation. The dust which is generated during such an operation provides a serious explosion hazard and must be frequently removed and the equipment must be cleaned. Furthermore, the media used must be constantly replenished because of the degradation involved. The treatment of the finished parts to remove any small particles of the deflashing media which have adhered thereto, the cleaning of the equipment, the replenishment of the deflashing media and the addition of water during the deflashing operation to minimize the explosion hazard are all time-consuming, troublesome and expensive.

It is therefore a primary object of this invention to provide an improved process for deflashing formed parts.

Another object of the invention is to provide an improved process for deflashing parts molded of synthetic resin material or rubber involving the use of deflashing media which do not generate dust, thus providing safer operating conditions.

Briefly stated, these and other objects may be attained in accordance with our invention by a process for deflashing formed parts which comprises propelling discrete particles of a polycarbonate resin having mean diameters of from about 25 mils to about 200 mils at the parts at a velocity of at least 50 feet per second for a period of time sufficient to remove the flash from the surfaces of the formed parts.

The diameters of the polycarbonate resin particles, as well as the velocity at which these particles are propelled at the molded parts in accordance with the invention, are critical. For example, particles having mean diameters substantially below 25 mils have insufficient mass to effectively deflash formed metal or molded resin parts within the range of velocities which may be imparted to such particles by apparatus, such as a rotating wheel, for instance, which is conventionally employed in such operations. On the other hand, particles having diameters substantially in excess of 200 mils possess too much mass and cause abrasion of the surfaces of the molded parts during the deflashing process. Moreover, particles, having mean diameters in excess of 200 mils tend to lodge in certain areas of the molded parts undergoing treatment. In general, particles having mean diameters ranging from about 30 mils to about 100 mils, and preferably 50 to 60 mils, provide particularly good results.

The velocity at which the polycarbonate particles are propelled at formed parts in accordance with the process of the invention must be greater than 50 feet per second to deflash these parts effectively. Generally speaking, velocities ranging from about 100 to 200 feet per second are preferred for particles having mean diameters ranging from 30 to 100 mils. Although the particles may be propelled at velocities in excess of 300 feet per second, such velocities are neither necessary nor are they practical since at higher velocities the polycarbonate particles will abrade or scratch the surface of the formed parts.

The time required to deflash effectively solid formed parts in accordance with this invention will vary depending upon the nature of the material of which the solid parts to be deflashed are formed, the thickness of the flash, and the size, velocity and nature of the polycarbonate particles propelled at these parts. Generally speaking, when parts formed of synthetic resin materials such as, for example, phenol formaldehyde resins or epoxy resins, are to be deflashed, and polycarbonate particles having mean diameters ranging from 50 to 60 mils are propelled onto the parts at a velocity of from about 100 to 200 feet per second, a period of time of from two to three minutes will suffice.

As will be appreciated by those skilled in the art, the configuration of the polycarbonate particles may vary to a large extent. However, particles which are spherical or cylindrical are generally preferred. In the event a cylindrical particle is employed, the diameter of the cylinder should be substantially equivalent to the height. The term "mean diameter" as used herein is meant to define the average diameter of a spherical particle or of a cylindrical particle whose height is substantially equal to its diameter. Particles formed of a polycarbonate resin containing a filler, such as silica, glass fibers, titanium dioxide, Carborundum dust, etc., may also be used to advantage in accordance with the invention.

A particular advantage of the process of the invention is that no dust is generated during the deflashing operation. Accordingly, an explosion hazard is avoided and a dust collector, which is normally employed with conventional deflashing equipment, may be entirely eliminated. Further, the time required to deflash or clean formed resin parts is substantially less, i.e., of the order of 35 to 50% less, when employing the present process as compared with the time required by employing the deflashing processes of the prior art. In addition, no substantial "unraveling" of the polycarbonate particles takes place during the deflashing operation, a problem which is particularly acute when employing deflashing media of other resin materials, such as nylon, for example. "Unraveling" is the tendency of the media used to develop strands of film which unwinds from the surfaces of the pellets employed. Also, moisture addition to the polycarbonate deflashing media is unnecessary and minimum degradation of the surface of the molded parts which are to be deflashed occurs when employing polycarbonate resin particles in accordance with the invention.

Propulsion of the polycarbonate particles onto the surfaces of parts to be deflashed in accordance with the invention may be accomplished with the aid of a variety of well-known deflashing apparatus as, for example, Wheelabrator Tumblasts and Tables, Pangborn Rotoblasts and Blasting Cabinets. One method for propelling the particles onto the parts to be deflashed comprises the use of a rapidly rotating wheel into which the polycarbonate pellets are fed and by which they are hurled onto the parts. The parts may be so deflashed in a batch type operation in which they are tumbled on an endless rubber belt rotating in the blast pattern of particles hurled from the rapidly rotating wheel which is positioned above the belt. This method is particularly useful in connection with deflashing large volumes of relatively small parts and may be employed with parts of virtually any size which are not too delicate to withstand the tumbling action of the process.

Continuous deflashing may be accomplished by moving the molded parts to be treated continuously as with a conveyor belt under the blast pattern of the polycarbonate particles from the rotating wheel or wheels which are employed.

As will be appreciated by those skilled in the art, a pellet recycling system may be advantageously employed in either the continuous or batch type deflashing operation.

The polycarbonate resins useful in providing the deflashing particles employed in accordance with the process of the invention are aromatic carbonate polymers or resins which may be prepared by reacting a dihydric phenol with a carbonate precursor, such as phosgene, a bishaloformate or a carbonate ester. Generally speaking, such carbonate polymers may be typified as possessing recurring structural units of the formula

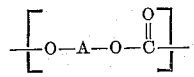

where A is a divalent aromatic radical of the dihydric phenol employed in the polymer producing reaction. Preferably, the carbonate polymers used to provide the resinous mixtures of the invention have an intrinsic viscosity (as measured in p-dioxane in deciliters per gram at 30° C.) ranging from about 0.35 to about 0.75. The dihydric phenols which may be employed to provide such aromatic carbonate polymers are mononuclear or polynuclear aromatic compounds, containing as functional groups, two hydroxyl radicals, each of which is attached directly to a carbon atom of an aromatic nucleus. Typical dihydric phenols are 2,2 bis-(4-hydroxyphenyl) propane; hydroquinone; resorcinol; 2,2 bis-(4-hydroxyphenyl) pentane; 2,4′ dihydroxydiphenyl methane; bis-(4-hydroxy-5-nitrophenyl) methane; 1,1 bis-(4-hydroxyphenyl) ethane; 3,3 bis-(4-hydroxyphenyl) pentane; 2,6 dihydroxy naphthalene; bis-(4-hydroxyphenyl) sulfone; 2,4′ dihydroxydiphenyl sulfone; bis-(4-hydroxyphenyl) diphenyl disulfone; 4,4′ dihydroxydiphenyl ether; and 4,4′ dihydroxy-2,5-diethoxydiphenyl ether. A variety of additional dihydroxy phenols which may be employed to provide such carbonate polymers are disclosed in U.S. Patent 2,999,835—Goldberg, assigned to the assignee of the present invention. It is, of course, possible to employ two or more dihydroxy phenols or a dihydric phenol in combination with a glycol, a hydroxy- or acid-terminated polyester, or a dibasic acid in the event a carbonate copolymer rather than a homopolymer is desired for use in the preparation of the polycarbonate particles used in the practice of the process of the invention. More specific disclosures for prepared polycarbonate resins, as well as other materials and polymers prepared therefrom, may be found in Canadian Patent 661,282 and in U.S. Patent 3,030,331, assigned to the assignee of this invention.

In order that those skilled in the art may better understand how the present invention may be practiced, the following examples are given by way of illustration and not by way of limitation. All parts and percentages are by weight unless otherwise noted.

EXAMPLE 1

Articles molded of phenol formaldehyde and urea formaldehyde resin were deflashed in a table type wheel abrader using a mixture of 80% of nylon particles having particle sizes ranging from about 30 to 40 mils and 20% of polycarbonate resin particles of the same size. The poly-carbonate employed was poly p,p′-(2,2-diphenylenepropane)carbonate having an intrinsic viscosity of 0.45 as measured in p-dioxane in deciliters per gram at 30.3° C. The wheel used to propel these particles at the parts to be deflashed imparted velocities to these particles ranging from 130 to 195 feet per second. During the deflashing operation, the nylon particles became degraded and produced excessive dusting. The polycarbonate particles remained unchanged. During the course of the run additional nylon particles were added to compensate for dust losses. Approximately 35% of the nylon particles were degraded to dust in one week's time. Degradation of the surface of the molded parts which were being deflashed was observed.

EXAMPLE 2

Example 1 was repeated except that 100% of polycarbonate resin particles having mean diameters of 62.5 mils were employed. The velocity at which these particles were propelled at the molded resin parts to be deflashed was of the order of 160 feet per second. No degradation of the polycarbonate particles was observed after a deflashing period of one week. No water was added to the medium and no dust from the polycarbonate particles was deposited on the molded parts undergoing deflashing treatment. The surface finish of the treated parts was superior to the surface finish of parts treated in the previous example, no detectable surface degradation of the molded parts having occurred. Throughout the entire run no replenishment of the polycarbonate particles was required.

In general, any solid part formed of a metal or resinous material, either natural or synthetic, may be deflashed in accordance with the process of the present invention. The process is particularly applicable to parts molded of synthetic resinous materials, such as thermosetting resins, as, for example, phenol formaldehyde resins, urea formaldehyde resins and epoxy materials. The process is also applicable in deflashing parts molded of thermoplastic resins as, for example, polyethylene, polypropylene, polystyrene, polyacetal resins, nylon, polycarbonate resins, polyphenylene oxide resins and polyester resins. Parts formed of synthetic resin materials containing fillers such as, for example, silica dust, glass fibers, diatomaceous earth, carbon black, wood flour, powdered metal, and titanium dioxide may also be deflashed in accordance with the invention.

The use of polycarbonate resin particles, in either filled or unfilled form, in accordance with the process of the invention, is particularly useful in cleaning flash form molded articles at extremely low temperatures. In such a process, the temperature of the parts to be deflashed is lowered (generally with Dry Ice) so as to embrittle the flash. Conventional non-metallic media have been found to degrade very rapidly when used in such procedures due to the low temperatures. Metal deflashing media, such as metal shot, for example, when used in such low temperature deflashing processes have been found to seriously degrade the surfaces of the parts undergoing the deflashing treatment. The superior low temperature characteristics of polycarbonate resins, on the other hand, render the use of polycarbonate deflashing media in low temperature processes particularly advantageous and provide a dust-free and efficient process.

What we claim as new and desire to secure by Letters Patent of the United States is:

1. A process for deflashing solid formed parts which compirses propelling discrete particles of a polycarbonate resin having mean diameters ranging from about 25 mils to about 200 mils at the parts at a velocity of at least 50 feet per second for a period of time sufficient to remove the flash from the surfaces of the parts.

2. The process of claim 1 in which the polycarbonate is poly p,p'-(2,2-diphenylene-propane) carbonate.

3. The process of claim 1 in which the particles have mean diameters ranging from about 30 mils to about 100 mils.

4. The process of claim 1 in which the velocity of the particles is in the range of from about 100 to about 200 feet per second.

References Cited by the Examiner
UNITED STATES PATENTS

| | | | |
|---|---|---|---|
| 2,426,072 | 8/1947 | Ridgewood et al. | 51—320 |
| 2,996,846 | 8/1961 | Leliaert | 51—320 XR |
| 3,090,166 | 5/1963 | Straub | 51—320 XR |
| 3,160,993 | 12/1964 | McCormick | 51—9 |

LESTER M. SWINGLE, *Primary Examiner.*